J. H. Chapman,
Grappling Iron.

N° 57,476.  Patented Aug. 28, 1866.

Witnesses
A. McClinch
J. Tripp

Inventor
Jno. H. Chapman

UNITED STATES PATENT OFFICE.

JOHN H. CHAPMAN, OF UTICA, NEW YORK.

IMPROVEMENT IN GRAPPLING-IRONS.

Specification forming part of Letters Patent No. 57,476, dated August 28, 1866.

*To all whom it may concern:*

Be it known that I, JOHN H. CHAPMAN, of the city of Utica, county of Oneida and State of New York, have invented a new and Improved Apparatus or Grappling-Irons for suspending pulley-blocks of horse hay-forks and the like; and I do hereby declare that the following is a full, clear, and exact description of the construction and operation of the same, reference being had to the accompanying drawings, making a part of this specification.

Figure 1:
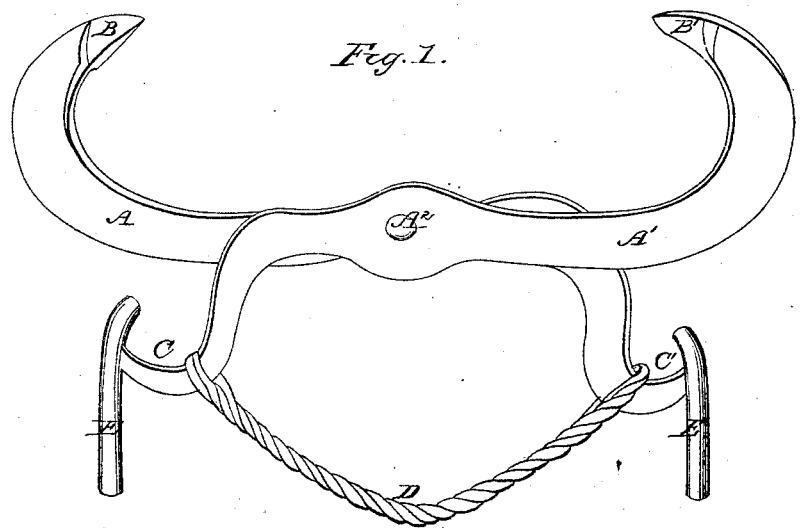
Figure 2:
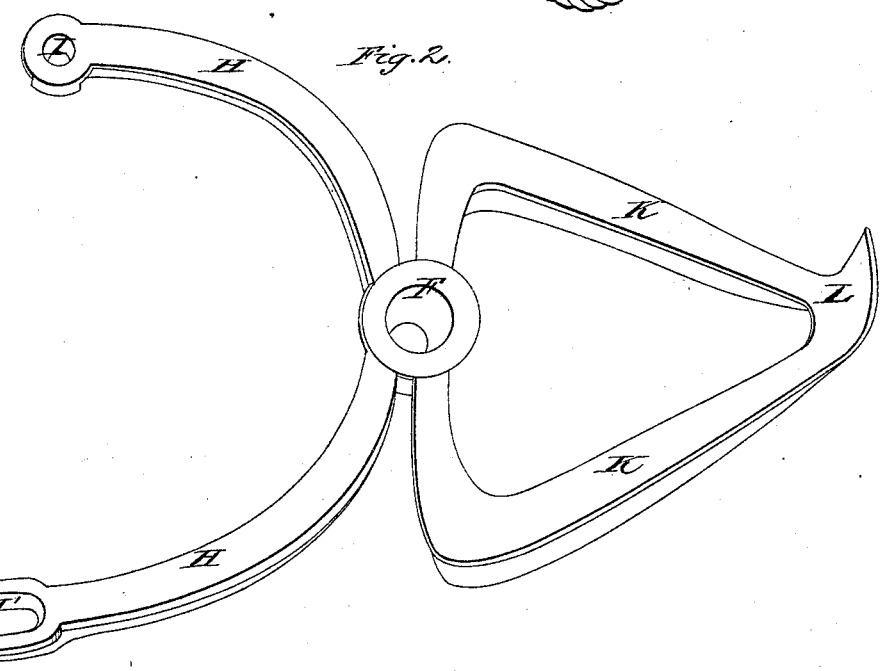

Figure 1 represents the grappling-irons, and Fig. 2 the elevating and detaching implement.

The nature of my invention consists in so constructing the grappling-irons that they may be readily attached to a rafter, beam, or ridge-pole in any position, while the weight of the pulley-blocks, ropes, or load will keep them in place; and, second, the means of elevating said grappling-irons to the desired point; and, third, the mode of detaching and lowering the same.

A and A' represent the two sides or parts of the grappling-irons, jointed in the center at A². They are pointed at the ends B and B', so as to take hold readily of the object to which they are to be attached, and they have their opposite ends C and C' curved in the form of hooks, in which the rope D, formed into a loop, is placed to serve for closing the grappling-irons as well as suspending the pulley-blocks and load. The hooks C and C' may be in any other form that will serve to hold the loop D; and, instead of a rope, D, there may be a chain or jointed links or the like.

E and E' are points extending downward from said hooks C and C', respectively, for the purpose of aiding in the manipulation of the grappling-irons when elevating and adjusting them.

The elevating and detaching implement consists of a central socket, F, in which is placed one end of a pole of sufficient length to reach the place where the grapple is to be placed. On one side of this socket F are two horizontal arms, H and H'. H has a hole or socket, I, at its extremity, and H' has an open slot, I', at its extremity, which slot is a small segment of a circle, of which the hole I is the center. K is the detaching part, and is placed on the side opposite to the arms H and H'. It is of triangular form, with the base against the socket F, and its opposite end L turns up like a broad hook.

The mode of operation is as follows: The loop or rope D is placed in the hooks C and C', and the pulley-block hooked onto D, and the extension-points E and E' of the grapple are placed, the one in the hole I and the other in the slot I', which causes the points B and B' to open to the desired extent to grasp the rafter. They are then raised to the desired place by the pole. The point B on the side of I is pressed against the rafter, and the elevating implement is turned round horizontally until the other point, B', touches the opposite side of the rafter, which will arrest the movement of the grapple, and a slight further turn of the elevating implement will throw out the point E' from the slot I', when the grappling-irons, being no longer kept apart, the weight of the pulley and rope pressing on D draws them together against the rafter, and the points entering the wood will adhere as long as desired.

When it is desired to take down the pulley the detaching part K K is run between the loop D and the joint A² of the grapple, and by pressing slightly upward and forward the hooks are forced open, and they may then be lowered.

The hooked end L serves to keep the whole from falling, though it is not absolutely essential.

By the use of the grappling-irons substantially as described, the pulley or ropes for horse hay-forks or similar purposes may be attached to any desired place readily without tying, driving, or screwing in a hook or the like, while the use of the elevating and detaching implement renders unnecessary the use of a ladder or climbing.

I claim—

1. The grappling-irons with the hooked ends and extension-points, or their equivalents, substantially as described, for the uses and purposes mentioned.

2. The elevating implement, with or without the detaching part, constructed and operating substantially as described, for the uses and purposes mentioned.

3. The grappling-irons and the elevating implement, with or without the detaching part, in combination, substantially as described, and for the uses and purposes mentioned.

JNO. H. CHAPMAN.

Witnesses:
A. MELHINCH,
I. TRIPP, Jr.